United States Patent
Hu et al.

(10) Patent No.: US 10,677,040 B2
(45) Date of Patent: Jun. 9, 2020

(54) MATERIAL EVALUATION USING NUCLEAR LOGGING TOOL

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/757,613

(22) PCT Filed: Nov. 19, 2015

(86) PCT No.: PCT/US2015/061572
§ 371 (c)(1),
(2) Date: Mar. 5, 2018

(87) PCT Pub. No.: WO2017/086973
PCT Pub. Date: May 26, 2017

(65) Prior Publication Data
US 2018/0245451 A1    Aug. 30, 2018

(51) Int. Cl.
*E21B 47/00* (2012.01)
*G01V 5/12* (2006.01)
*G01V 5/10* (2006.01)
*E21B 33/14* (2006.01)

(52) U.S. Cl.
CPC .......... *E21B 47/0005* (2013.01); *G01V 5/101* (2013.01); *G01V 5/125* (2013.01); *E21B 33/14* (2013.01)

(58) Field of Classification Search
CPC ...... E21B 47/0005; E21B 33/14; G01V 5/125
See application file for complete search history.

(56) References Cited

U.S. PATENT DOCUMENTS

| 2,231,577 | A |   | 2/1941  | Hare  |             |
|-----------|---|---|---------|-------|-------------|
| 3,930,153 | A | * | 12/1975 | Scott | G01V 5/102  |
|           |   |   |         |       | 250/262     |
| 4,004,147 | A |   | 1/1977  | Allen |             |
| 4,092,536 | A |   | 5/1978  | Smith |             |
| 4,384,205 | A |   | 5/1983  | Flaum |             |

(Continued)

FOREIGN PATENT DOCUMENTS

| EP | 0443936 A1 | 8/1991 |
| GB | 2037439 A  | 7/1980 |

(Continued)

OTHER PUBLICATIONS

"International Application Serial No. PCT/US2015/061572, International Search Report dated Aug. 19, 2016", 3 pgs.

(Continued)

*Primary Examiner* — Marcus H Taningco
(74) *Attorney, Agent, or Firm* — Gilliam IP PLLC

(57) ABSTRACT

A method for material evaluation may include detecting photons from gamma ray interactions with material in an annular region between a geological formation and a casing. An energy spectrum is generated from the detected photons. A difference between materials may then be detected based on a comparison of the generated energy spectrum with a reference spectrum for a known material (e.g., good cement, known fluid).

20 Claims, 7 Drawing Sheets

(56) References Cited

U.S. PATENT DOCUMENTS

| | | | |
|---|---|---|---|
| 4,459,480 A | 7/1984 | Dimon | |
| 4,507,554 A * | 3/1985 | Hertzog | G01V 5/108 250/269.8 |
| 4,698,500 A | 10/1987 | Scala | |
| 4,810,876 A * | 3/1989 | Wraight | G01V 5/10 250/256 |
| 5,578,820 A * | 11/1996 | Gadeken | G01V 5/06 250/256 |
| 5,783,822 A * | 7/1998 | Buchanan | C04B 22/00 250/259 |
| 9,746,582 B1 * | 8/2017 | Zhou | G01V 5/102 |
| 2006/0233048 A1 | 10/2006 | Froelich et al. | |
| 2009/0205825 A1 | 8/2009 | Smith, Jr. et al. | |
| 2012/0031613 A1 | 2/2012 | Green | |
| 2012/0075953 A1 * | 3/2012 | Chace | E21B 47/0005 367/35 |
| 2012/0175511 A1 | 7/2012 | Masnyk et al. | |
| 2013/0062057 A1 | 3/2013 | Smith, Jr. | |
| 2013/0261974 A1 * | 10/2013 | Stewart | G01V 5/125 702/8 |
| 2013/0345983 A1 | 12/2013 | Guo | |
| 2014/0217273 A1 | 8/2014 | Grau | |
| 2014/0374582 A1 | 12/2014 | Guo et al. | |
| 2015/0090871 A1 * | 4/2015 | Chace | E21B 47/0005 250/269.7 |
| 2015/0108339 A1 | 4/2015 | Guo et al. | |
| 2016/0327681 A1 * | 11/2016 | Lexa | G01T 7/005 |
| 2017/0199298 A1 * | 7/2017 | Hu | G01V 5/12 |

FOREIGN PATENT DOCUMENTS

| | | |
|---|---|---|
| WO | 2011127156 A2 | 10/2011 |
| WO | 2012083210 A2 | 6/2012 |
| WO | 2015102574 A1 | 7/2015 |
| WO | 2015112118 A1 | 7/2015 |
| WO | 2017030578 A1 | 2/2017 |

OTHER PUBLICATIONS

"International Application Serial No. PCT/US2015/061572, Written Opinion dated Aug. 19, 2016", 10 pgs.

EP Application Serial No. 15908961.4, Extended European Search Report, dated Sep. 27, 2018, 10 pages.

U.S. Appl. No. 15/039,366, Non-Final Office Action, dated Nov. 20, 2018, 8 pages.

GCC Serial No. 201428675; Third Examination Report; dated Aug. 15, 2018, 4 pages.

GCC Application Serial No. GC 201428675, First Examination Report, dated Sep. 28, 2017, 5 pages.

GCC Application Serial No. GC 201428675, Second Examination Report; dated Jan. 21, 2018, 5 Pages.

EP Application Serial No. 13900836, EP Search Report, dated Aug. 3, 2017, 7 pages.

"Application Serial No. PCT/US2013/078285, International Preliminary Report on Patentability dated Nov. 23, 2015", 4 pgs.

"International Application Serial No. PCT/US2013/078285, International Search Report dated Sep. 29, 2014", 3 pgs.

"International Application Serial No. PCT/US2013/078285, Written Opinion dated Sep. 29, 2014", 7 pgs.

Anderson, et al., "Acoustic Cement Bond Logging", SPWLA 2nd Annual Logging Symposium, May 18-19, 1961, Dallas, Texas, 14 pgs.

U.S. Appl. No. 15/039,366, Notice of Allowance, dated Jul. 25, 2019, 7 pages.

Indonesia Application Serial No. P00201603266, First Office Action, dated Apr. 12, 2019, 3 pages.

* cited by examiner

US 10,677,040 B2

MATERIAL EVALUATION USING NUCLEAR LOGGING TOOL

BACKGROUND

Natural resources such as gas, oil, and water residing in a geological formation may be recovered by drilling a wellbore into the formation. A string of pipe (e.g., casing) is run into the wellbore in order to provide structural support for the wellbore sides. The casing may be metal (e.g., steel).

Primary cementing may be performed whereby a cement slurry is injected into the annulus between the casing and the geological formation. The cement is permitted to set into a hard mass (i.e., a sheath) to thereby support the string of pipe within the wellbore and seal the annulus. Due to the tightly coupled nature of the formation, sheath, and casing, it may be difficult to evaluate the materials between the pipe and the geological formation.

DETAILED DESCRIPTION

Some of the challenges noted above, as well as others, can be addressed by implementing the apparatus, systems, and methods described herein. In many examples, a heterogeneous structure behind a casing may be evaluated using either a passive radiation detection tool or an active radiation tool. The passive tool may detect natural radioactivity from the geological formation while the active tool may detect reflections from radiation generated by a radioactive source in the tool. The differences between materials may then be detected by evaluation of the detected spectrum shape in one or more energy ranges. For example, cement quality may be evaluated using such a technique.

As used here in, detecting differences between materials may be defined as detecting a first material when a second material is expected to be in that location. For example, if a fluid (e.g., drilling mud, air) is detected in the annular region when cement is expected to be in that region, the cement may have voids filled with the fluid and thus be considered to be bad cement or the cement may be missing.

Figure 1:
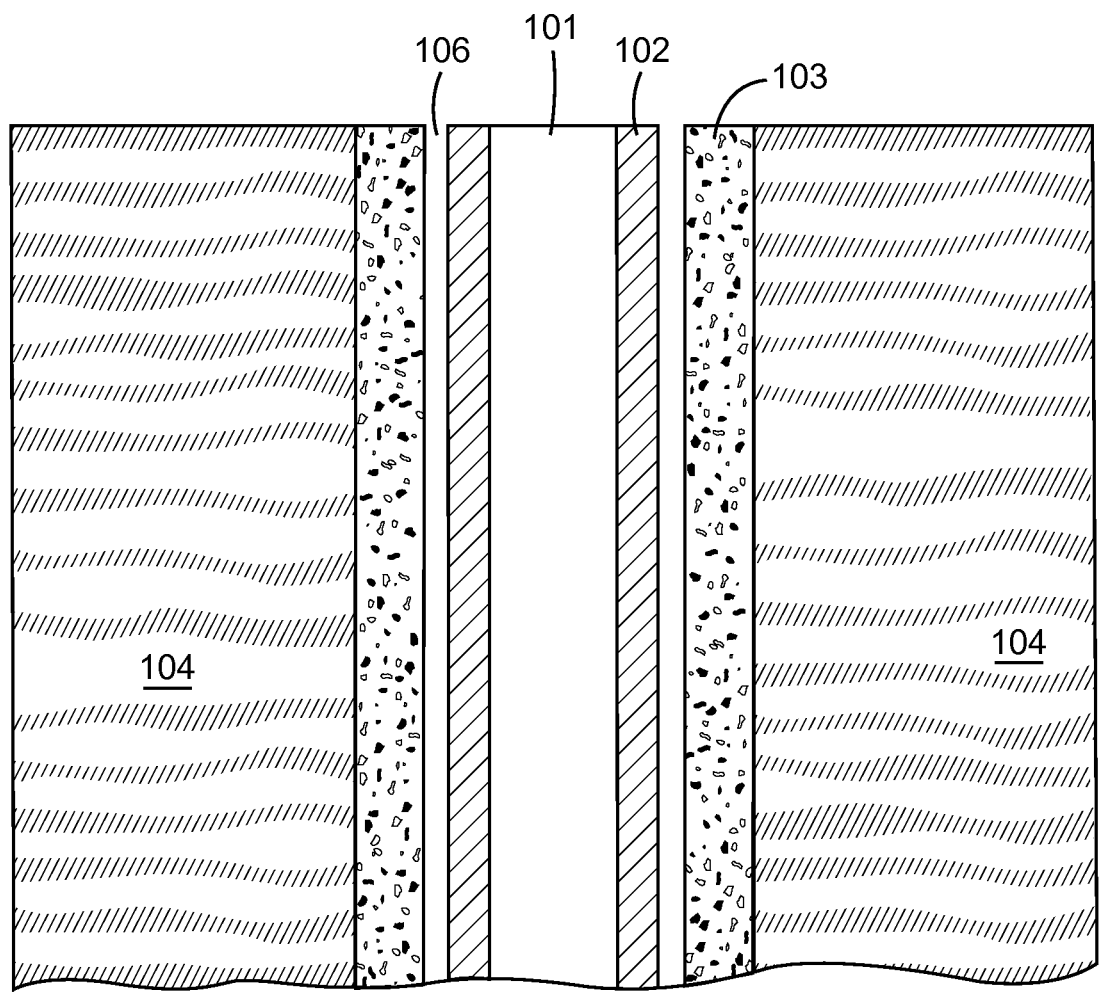
FIG. 1 is a cross-sectional diagram of a cased borehole in a geological formation, according to various examples of the disclosure.

FIG. 1 is a cross-sectional diagram of a cased borehole 101 in a geological formation 104, according to various examples of the disclosure. The borehole 101 is lined with the casing 102 that may comprise a metal (e.g., steel). Cement 103 is injected into the borehole 101 such that, after it reaches the bottom of the borehole, it returns upward in the annular region between the casing 102 and the formation 104. Thus, the cement stabilizes the casing 102 within the borehole 101. Gaps 106 or imperfections may be present between the casing 102 and the cement 103 or within the cement 103.

Due to possible imperfections introduced into the cement 103 during construction and/or subsequent wear damage caused by use of the borehole, it is often desirable to perform non-destructive testing of the cement 103 or other material between the casing 102 and the formation 104. Using a logging tool having at least one detector and an optional radioactive source, possible gaps or imperfections in the cement or gaps 106 between the casing 102 and the cement 103 may be discovered. Various examples of nuclear logging tools, as described subsequently, may be used to detect the presence of these imperfections.

The subsequently described examples of various nuclear logging tools may be located in a drill string tool housing to be used during a logging while drilling (LWD)/measurement while drilling (MWD) operation (see FIG. 7) or a wireline tool housing to be used during a wireline logging operation (see FIG. 8). The nuclear logging tools described herein are for purposes of illustration only as other nuclear logging tools may achieve substantially similar results. For example, any feature of the following example nuclear logging tools may be combined with one or more of the features of the other example nuclear logging tools.

Figure 2:
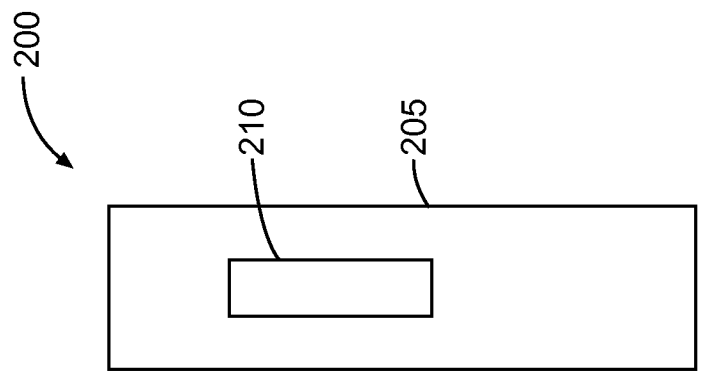
FIG. 2 is a block diagram showing a passive nuclear logging tool, according to various examples of the disclosure.

FIG. 2 is a block diagram showing a passive nuclear logging tool 200, according to various examples of the disclosure. This example of the nuclear logging tool 200 is typically used in a cased borehole for detection of natural radiation from the geological formation behind the cement.

The nuclear logging tool 200 includes the tool housing 205 that encloses a detector 210. The detector may be any device configured to detect natural radiation from the formation, such as gamma rays.

Natural sources of gamma rays on Earth include gamma decay from naturally occurring radioisotopes. Gamma rays are relatively high energy photons (e.g., >100 keV) with a frequency range greater than 10 exaHertz (EHz) (i.e., >$10^{19}$ Hz).

In operation, the passive nuclear logging tool 200 with the detector 210 is lowered into the cased borehole against the casing 102 (see also FIG. 1) to reduce or eliminate any gaps between the tool and the casing 102. The natural radiation from the formation behind the cement is detected by the detector. As the logging tool rotates in the azimuthal direction in the wellbore, the gamma ray from the formation interacts with the cement 103 encircling the wellbore at the same depth so that the entire diameter of the cement 103 is investigated as the tool moves through the wellbore. The energy spectra of the detected photons may be analyzed, as described subsequently, to detect differences between reference energy spectra and the detected spectra in order to determine differences between materials. The reference spectra are associated with known materials (e.g., good cement, known fluid). Thus, the differences between materials may be an indication of material quality such as cement quality in the annular region. As used herein, good cement may be defined as cement that is substantially free of voids relative to bad cement.

Figure 3:
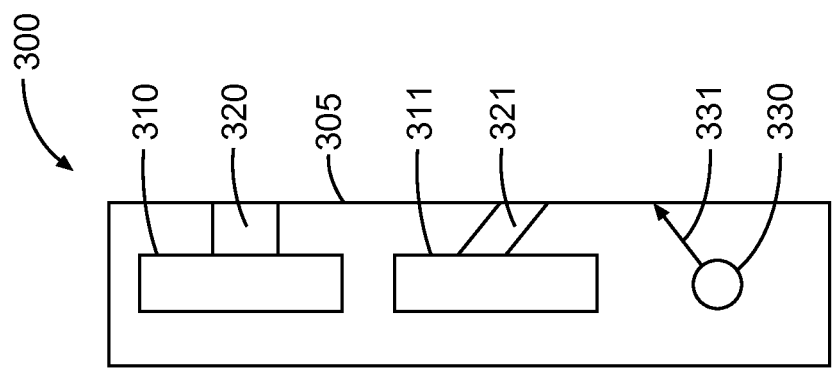
FIG. 3 is a block diagram showing an active nuclear logging tool having a high energy photon source, according to various examples of the disclosure.

FIG. 3 is a block diagram showing an active nuclear logging tool 300 having a high energy photon source, according to various examples of the disclosure. The illustrated logging tool 300 may include one or more gamma ray detectors 310, 311 within the tool body 305. While the illustrated example shows two detectors 310, 311, other examples are not limited to this quantity.

The one or more detectors 310, 311 may include a respective detector collimator 320, 321 that may be cut into detector shielding to allow photons scattered behind the casing to pass through. The collimator 320, 321 is used to limit the field of view of its respective detector 310, 311 so that gamma radiation from the intended source can be measured in the presence of background radiation from other sources. The size (e.g., diameter) of the detector collimators 320, 321, its relative position to a detector crystal and its angle (if any) relative to the source 330 may determine the amount of gamma rays (i.e., photons) detected by the respective detector 310, 311.

The nuclear logging tool 300 further includes a high energy photon source 330 (i.e., radioactive source, X-ray generator) for generating a photon beam. The radioactive source 330 may comprise any monochromatic high energy photon source, including a gamma ray source (e.g., chemical gamma, caesium-137). Heat generated by source operation may be dissipated through a cooling fluid (e.g., air, water, oil).

The radioactive source 330 may be configured to emit the gamma rays in a particular direction 331. For example, the gamma ray direction 331 may be angled more towards the detector(s) than straight out towards the formation. With the gamma ray direction 331 angled towards the detector and the detector collimator 320 angled towards the source 330, the detected photons may be mostly from the annular region.

As discussed subsequently in greater detail, one example of a detector collimator 321 may be angled more towards the source 330 than towards the formation. Another example of a detector collimator 320 may be angled more towards the formation than towards the source 330. Various examples of the detector collimator 320, 321 may also have various sizes in order to detect different desired energy spectra.

As used herein, a detector collimator 320 that is angled towards the formation comprises the input of the detector collimator 320 having an angle of approximately 90° with a longitudinal axis of the logging tool. A detector collimator 321 that is angled towards the source 330 comprises an input of the detector collimator 321 having an included angle of less than 90° with the longitudinal axis of the logging tool.

If the logging tool 300 includes a plurality of detectors 310, 311, one detector collimator 320 may be angled more towards the formation while another detector collimator 321 may be angled towards the radioactive source 330. Thus, one detector 310 may be used to detect natural radiation from the formation while the other detector 311 may be used to detect scattered photons from the material in the annular region.

In operation, the logging tool 300 may be placed against the casing 102 (see also FIG. 1) in the wellbore in order to reduce or eliminate any gaps between the tool 300 and the casing that might alter spectral measurements. Photons entering the cement 103 from the source 330 may be reflected back through interaction with cement 103 at certain depths. As the logging tool rotates in the azimuthal direction in the wellbore, the gamma ray interacts with the cement 103 encircling the wellbore at the same depth so that the entire diameter of the cement 103 or other material is investigated as the tool 300 moves through the wellbore.

Figure 4:
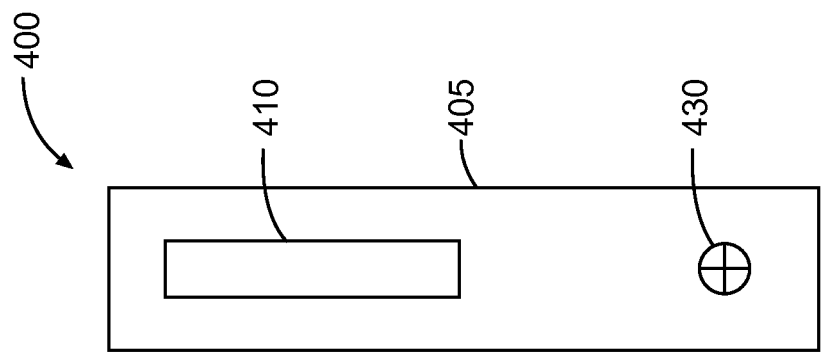
FIG. 4 is a block diagram showing another active nuclear logging tool having a neutron source, according to various examples of the disclosure.

FIG. 4 is a block diagram showing another active nuclear logging tool 400 having a neutron source 430, according to various examples of the disclosure. This tool 400 measures the gamma rays induced by the neutron interactions with the cement and formation.

This active nuclear logging tool 400 includes a gamma ray detector 410 within the tool body 405. The neutron source 430 may be any device that emits neutrons such as a chemical neutron source (e.g., americium beryllium (AmBe)) or a pulsed neutron generator.

In operation, the logging tool 400 may be placed against the casing 102 (see also FIG. 1) in the wellbore in order to reduce or eliminate any gaps between the tool 400 and the casing 102 that might alter spectral measurements. The neutrons emitted from the source 430 into the formation induce the formation to emit gamma rays that travel through the cement 103 and/or other materials between the casing and the formation. As the logging tool rotates in the azimuthal direction in the wellbore, the gamma ray from the formation interacts with the cement/materials 103 encircling the wellbore at the same depth so that the entire diameter of the cement 103 or other material is investigated as the tool 400 moves through the wellbore.

In each of the above examples of active nuclear logging tool 300, 400, the source may be located a predetermined detector-to-source distance below the respective detector in the tool body 305, 405. As used herein, the source being below the detector may be defined as the source being in a portion of the tool that enters the wellbore prior to the detector.

In the above examples of FIGS. 2-4, one or more logging tool design parameters (e.g., detector-to-source spacing, detector size, detector collimator size, and detector collimator angle) may be adjusted based on the type of gamma rays to be detected. Different design parameters may change the detected spectrum count rates, the spectrum sensitivity to cement quality, and/or the spectrum sensitivity to geological formation properties. By adjusting one or more of these design parameters in the logging tool, the tool may be optimized for a particular logging operation.

For example, the detector collimator angle design parameter may be determined based on the type of the gamma rays to be detected. One detector collimator 320 (see FIG. 3) is shown as being angled outward with respect to the source 330. Such an angle may be more conducive to receiving the natural radiation from the formation. Another detector collimator 321 is shown angled downward with respect to the source 330. Such an angle may be more conducive to receiving gamma rays from the source 330 that have been reflected back after interaction with the cement or other material between the pipe and the formation.

In another example, the collimator size and detector size design parameters may also be determined based on the type of gamma rays to be detected. A smaller detector may be more conducive to absorb gamma rays from lower energy sources (e.g., hundreds of keV) while gamma rays from higher energy sources (e.g., millions of keV) will pass through the detector.

Figure 5:
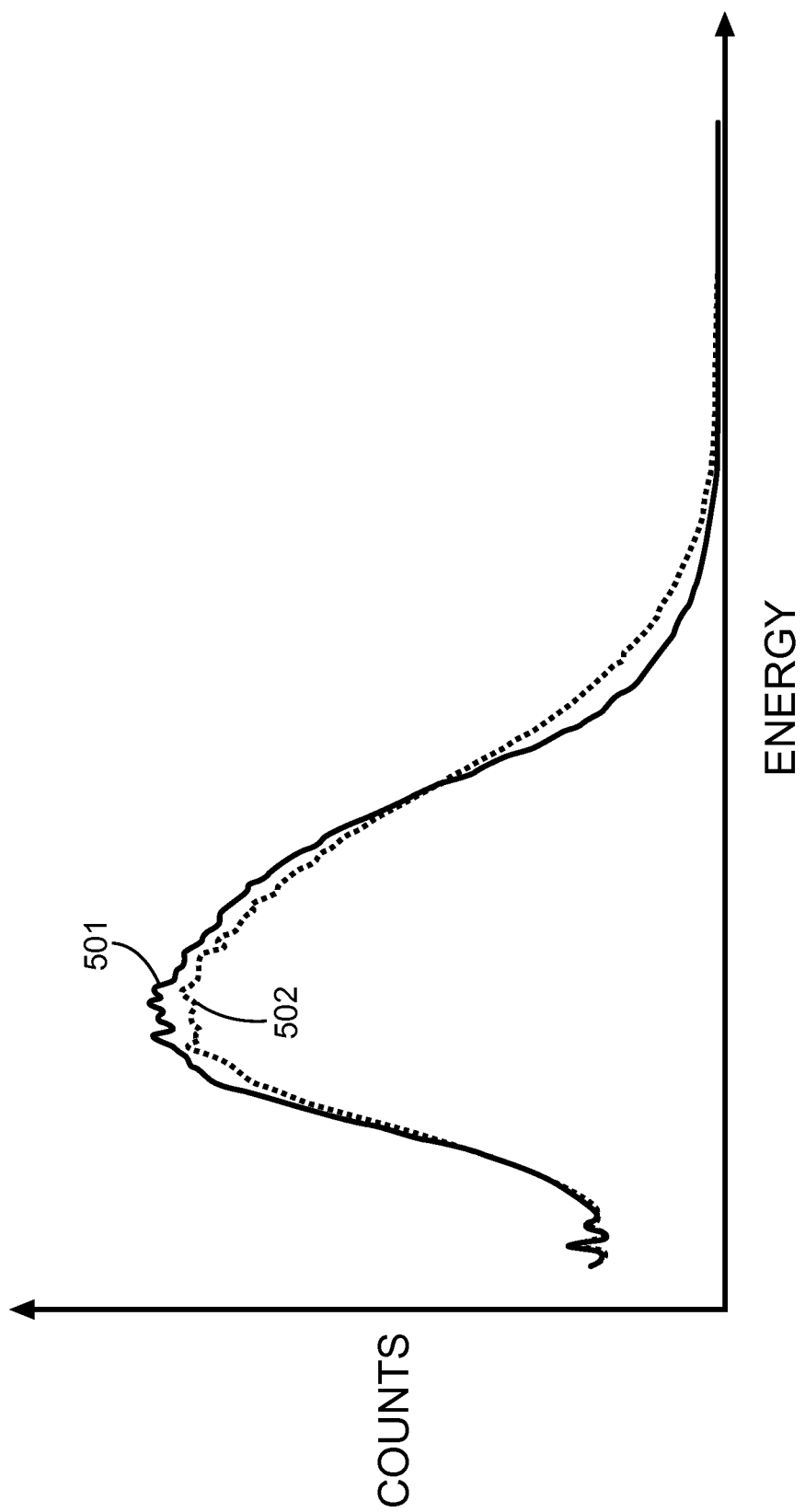
FIG. 5 is a graph showing an example of detected energy spectra associated with differences between materials, according to various examples of the disclosure.

FIG. 5 is a graph showing an example of detected energy spectra associated with differences between materials, according to various examples of the disclosure. The graph shows the count rates of detected photons along the y-axis and the energy of the count rates along the x-axis.

The detected energy spectra illustrate the result of the interaction of the photons after they have passed through the cement or other materials between the formation and the pipe. Thus if the detected energy spectra are compared with known reference spectra, a difference may be determined between the reference spectra and the detected spectra.

For example, FIG. 5 shows the gamma ray spectrum 501 from an intact cement (i.e., good cement) inside the annulus between casing and the formation. FIG. 5 also shows the detected spectrum 502 for cement with some voids or other imperfections. It can be seen that the detected spectrum 502 for the flawed cement is different in the spectrum shape from the reference spectrum 501 for the good cement.

This same method may be used for detection of other materials in the annulus. For example, if it is desirable to detect drilling fluid or water in the annulus, the detected spectrum is compared with a known spectrum for drilling fluid or water to determine the difference between what is known and what actually exists in the annulus.

The spectrum difference may be quantified by using slope change, correlation coefficients, amplitude, or other spectrum criteria. One or more reference spectra may be stored in a database to be used in a comparison operation to determine a difference between materials in the annulus. For example, the database may include reference spectra for good cement, drilling mud, water, or a void.

Figure 6:
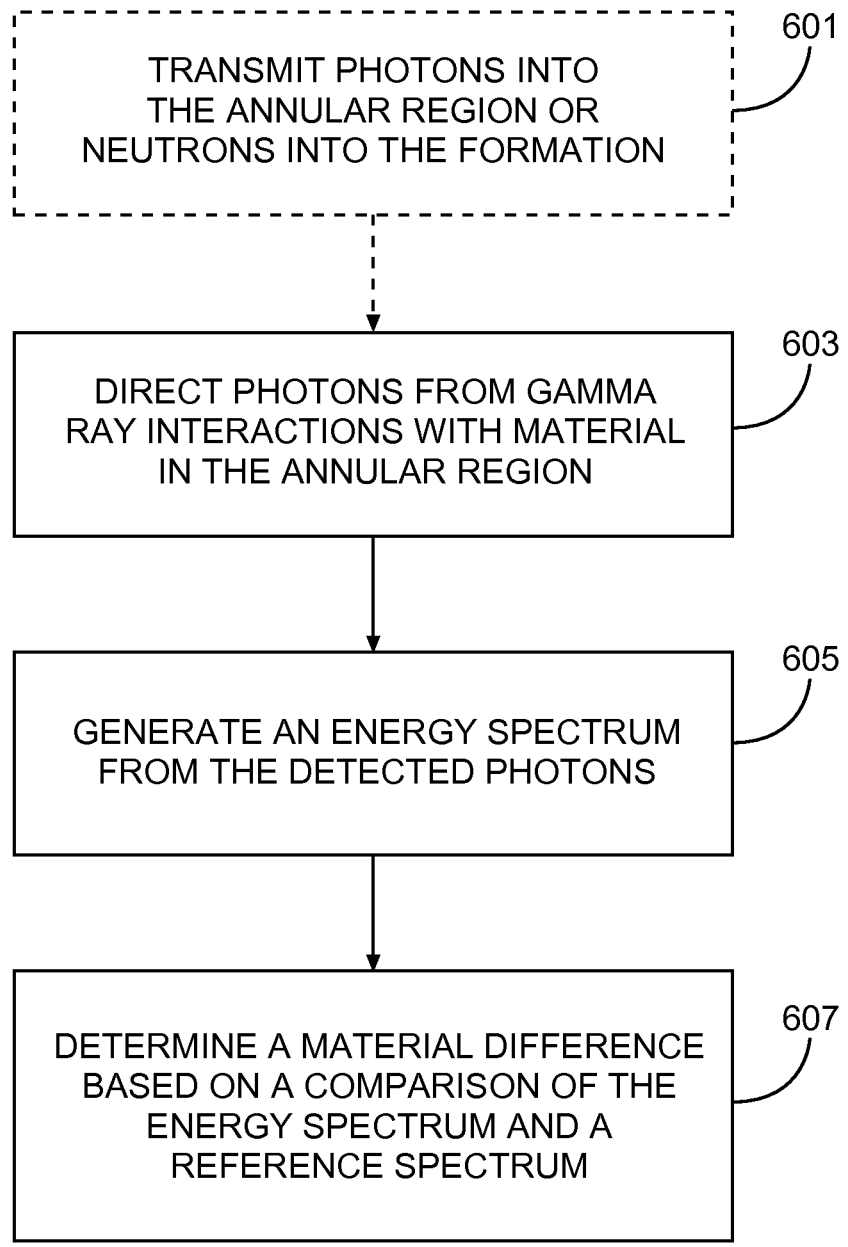
FIG. 6 is a flowchart of a method for performing material evaluation in a downhole environment, according to various examples of the disclosure.

FIG. 6 is a flowchart of a method for performing material evaluation in a downhole environment, according to various examples of the disclosure. The logging operation method may include, in block 601, an optional step of transmitting neutrons into a geological formation or transmitting high energy photons into the annular region. This step may be performed when an active nuclear logging tool (e.g., FIGS. 3 and 4) is used during the logging operation. Transmission of a high energy photon beam or neutrons is not necessary with a passive logging tool.

In block 603, photons are detected at a gamma ray detector. The photons are from gamma ray interactions with material in an annular region between a geological formation and a casing. The photons may have been reflected from an interaction with the cement or other material within the annular region. The photons may also be the result of the reaction of the transmitted neutrons with the geological formation. The photons may be detected on a detector comprising a collimator such that the tool design parameters (e.g., a detector-to-source distance, a collimator angle, and/or a collimator size) have been adjusted based on the type of logging operation being performed (e.g., passive detection, active detection, detection of good annulus cement, detection of annulus fluids).

In block 605, the detected photons are used to generate an energy spectrum. This step may further comprise digitizing the detected count rates of different energy levels in order to generate the energy spectrum.

In block 607, the generated energy spectrum is compared to a reference energy spectrum to determine a difference between materials in the annular region. For example, if is desired that good cement (e.g., free of voids) be present in the annular region, the detected spectrum is compared with a known good cement reference spectrum. If the comparison yields a difference between the spectra, the cement is not considered to be good cement. The comparison of spectra may be accomplished by comparing the slope change, correlation coefficients, and/or amplitude of the detected spectrum with the slope change, correlation coefficients, and/or amplitude of the reference spectrum from the database. Quantitative analysis of the spectrum change can be used to derive information about the cement integrity and material behind casing.

The method of FIG. 6 may be repeated continuously to continuously generate energy spectra as the logging tool is rotated and raised (or lowered) within the wellbore. Thus, the comparisons of continuously generated energy spectra with reference spectra may continuously generate annulus material evaluations. As the logging operation continues, the reference spectra may be changed or updated. For example, one area of the cased wellbore may be cemented so that a cement evaluation is performed while another area of the wellbore may have only fluids between the casing and the formation.

Figure 7:
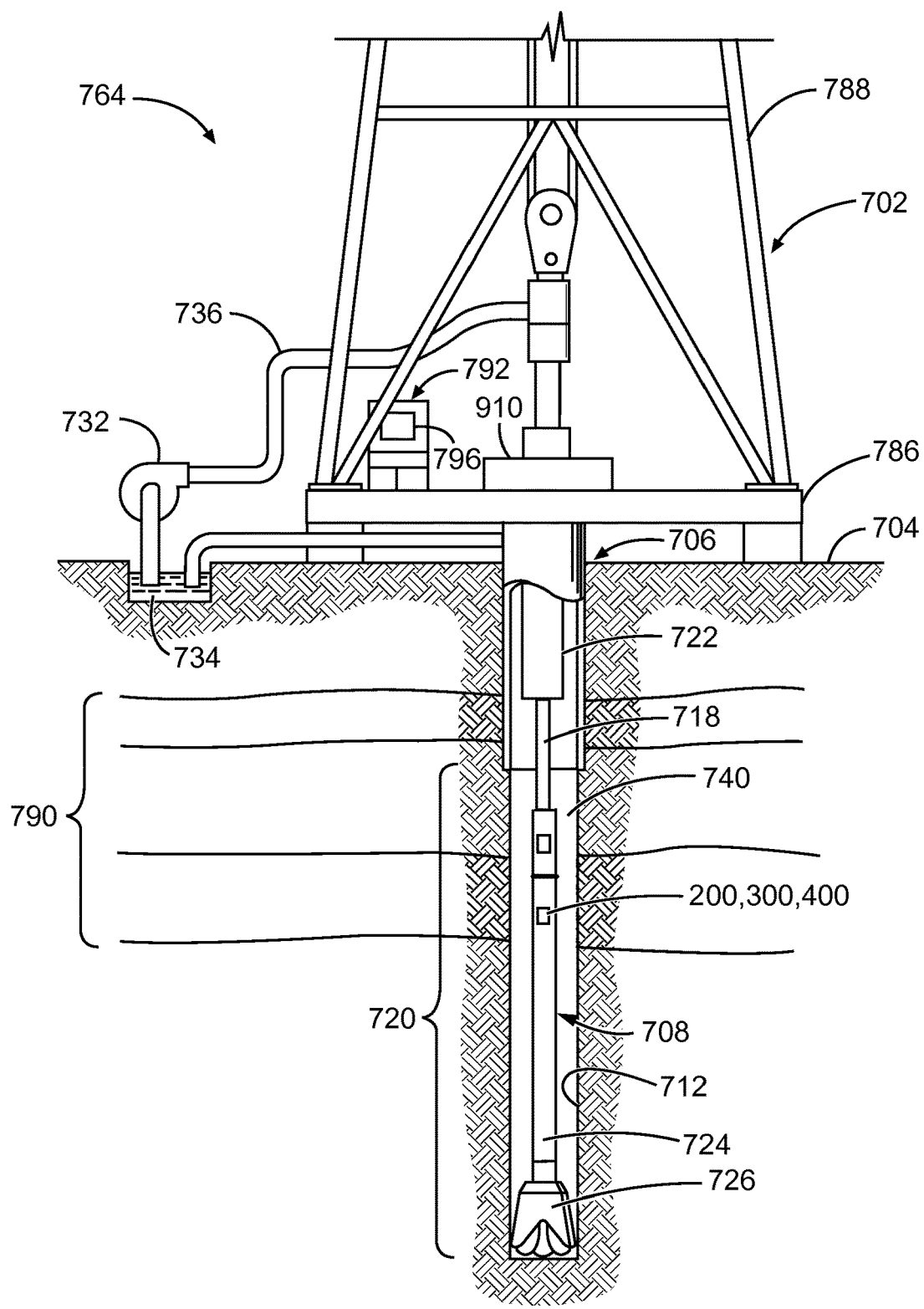
FIG. 7 is a diagram showing a drilling system, according to various examples of the disclosure.

FIG. 7 is a diagram showing a drilling system 764, according to various examples of the disclosure. The system 764 includes a drilling rig 702 located at the surface 704 of a well 706. The drilling rig 702 may provide support for a drillstring 708. The drillstring 708 may operate to penetrate the rotary table 710 for drilling the borehole 712 through the subsurface formations 790. The drillstring 708 may include a drill pipe 718 and a bottom hole assembly (BHA) 720 (e.g., drill string), perhaps located at the lower portion of the drill pipe 718.

The BHA 720 may include drill collars 722, a down hole tool 724 including the nuclear logging tool 200, 300, 400, and a drill bit 726. The drill bit 726 may operate to create the borehole 712 by penetrating the surface 704 and the subsurface formations 104. The downhole tool 724 may comprise any of a number of different types of tools besides the logging tool 210. The nuclear logging tool 200, 300, 400 may be used in MWD/LWD operations within a borehole 712 that has already been cased with casing and cement. Using the logging tool 200, 300, 400 during the MWD/LWD operations may provide data to the surface (e.g., hardwired, telemetry) on already cased and cemented portions of the borehole 712 as other portions of the borehole 712 are being drilled.

During drilling operations within the cased borehole 712, the drillstring 708 (perhaps including the drill pipe 718 and the BHA 720) may be rotated by the rotary table 710. Although not shown, in addition to or alternatively, the BHA 720 may also be rotated by a motor (e.g., a mud motor) that is located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations within the cased borehole 712, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid may then be returned to the mud pit 734, where such fluid is filtered. In some examples, the drilling fluid can be used to cool the drill bit 726, as well as to provide lubrication for the drill bit 726 during drilling operations. Additionally, the drilling fluid may be used to remove subsurface formation cuttings created by operating the drill bit 726.

A workstation 792 including a controller 796 may include modules comprising hardware circuitry, a processor, and/or memory circuits that may store software program modules and objects, and/or firmware, and combinations thereof that are configured to execute the method of FIG. 6. For example, the workstation 792 with controller 796 may be configured to digitize count rates of different energy into spectra, use the spectra slope change, correlation coefficients, and/or amplitude to determine differences between materials, and/or store a plurality of reference spectra in a database, according to the methods described previously.

Thus, in various examples, components of a system operable to conduct high energy photon detection, as described herein or in a similar manner, can be realized in combinations of hardware and/or processor executed software. These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 8:
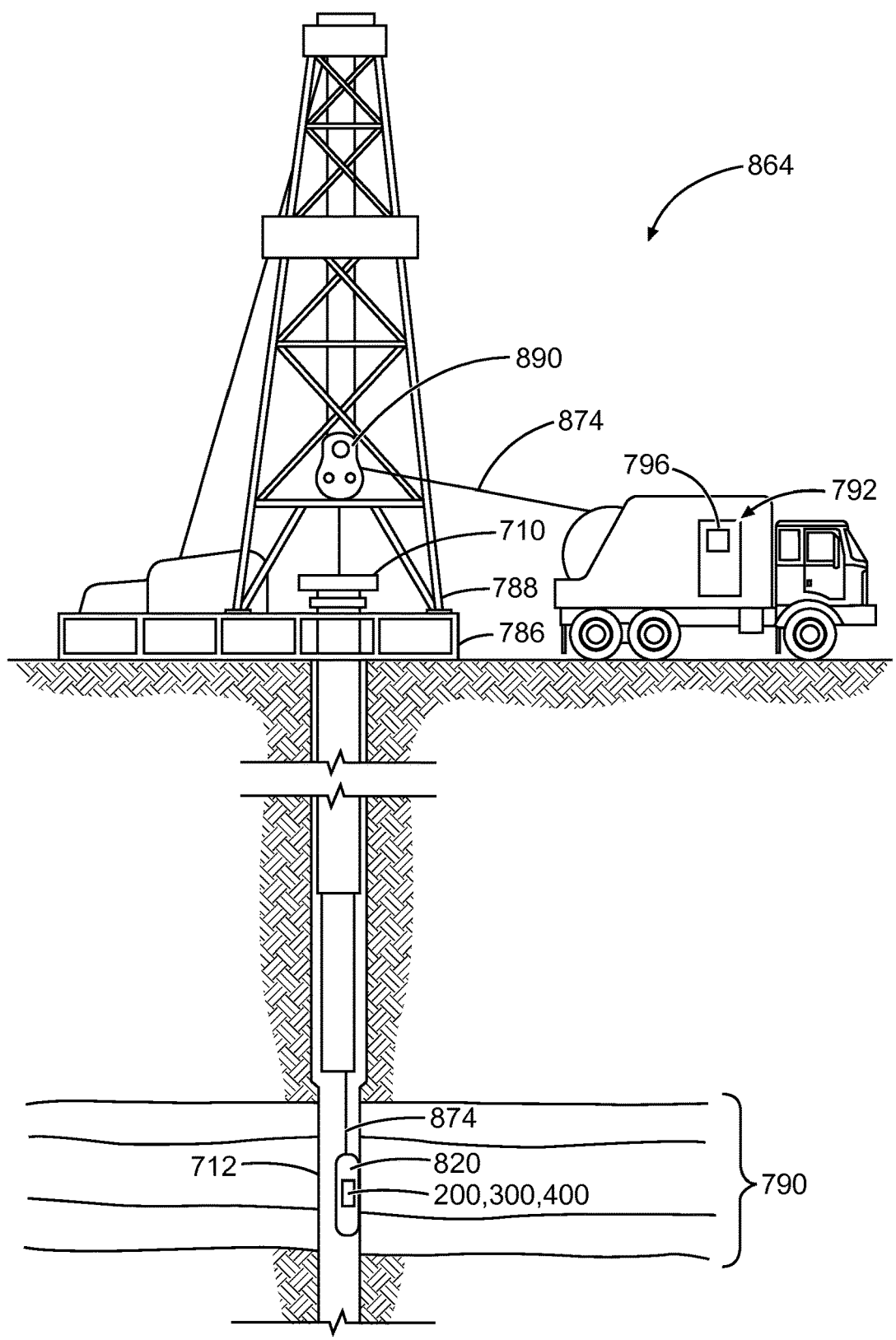
FIG. 8 is a diagram showing a wireline system, according to various examples of the disclosure.

FIG. 8 is a diagram showing a wireline system 864, according to various examples of the disclosure. The system 864 may comprise a wireline logging tool body 820, as part of a wireline logging operation in a cased and cemented borehole 712, that includes the logging tool 210 as described previously.

A drilling platform 786 equipped with a derrick 788 that supports a hoist 890 can be seen. Drilling oil and gas wells is commonly carried out using a string of drill pipes connected together so as to form a drillstring that is lowered through a rotary table 710 into the cased borehole 712. Here it is assumed that the drillstring has been temporarily removed from the borehole 712 to allow the wireline logging tool body 820, such as a probe or sonde with the logging tool 200, 300, 400, to be lowered by wireline or logging cable 874 (e.g., slickline cable) into the borehole 712. Typically, the wireline logging tool body 820 is lowered to the bottom of the region of interest and subsequently pulled upward at a substantially constant speed. In an embodiment, the logging tool 200, 300, 400 is immediately adjacent to the wall of the borehole 712.

During the upward trip, at a series of depths, various instruments may be used to perform quality measurements on the casing and cement lining of the borehole 712, as described previously. The wireline data may be communicated to a surface logging facility (e.g., workstation 792) for processing, analysis, and/or storage. The logging facility 792 may be provided with electronic equipment for various types of signal processing as described previously. The workstation 792 may have a controller 796 that is coupled to the logging tool 200, 300, 400 through the wireline 874 or telemetry in order to receive data from the logging tool regarding the detected photons and generate the energy spectra indicative of the differences between materials or cement quality.

Figure 9:
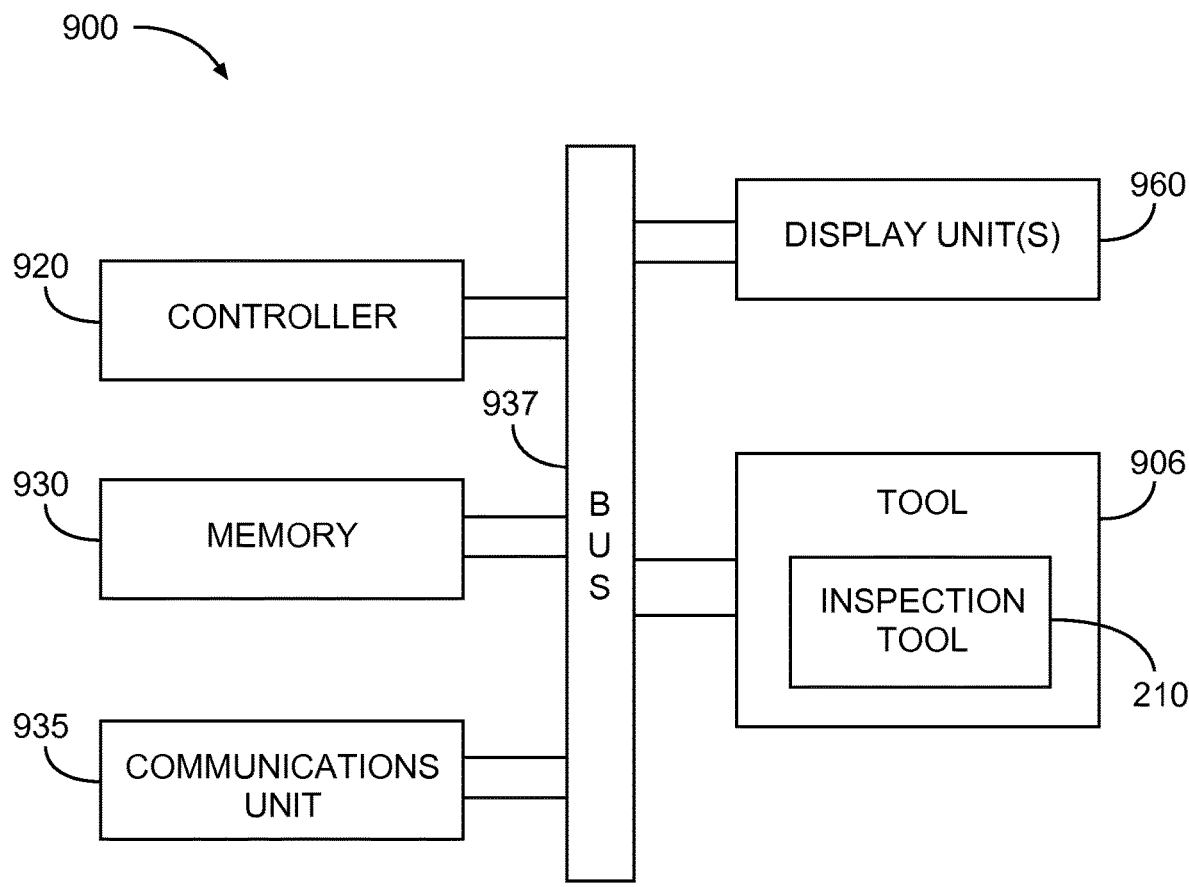
FIG. 9 is a block diagram of an example system operable to implement the activities of multiple methods, according to various examples of the disclosure.

FIG. 9 is a block diagram of an example system 900 operable to implement the activities of disclosed methods, according to various examples of the disclosure. The system 900 may include a tool housing 906 having the logging tool 200, 300, 400 such as that illustrated in FIGS. 2, 3, and 4. The system 900 may be configured to operate in accordance with the teachings herein to perform formation independent cement evaluation measurements in order to determine the quality of cement between the casing and the formation. The system 900 of FIG. 9 may be implemented as shown in FIGS. 7 and 8 with reference to the workstation 792 and controller 796.

The system 900 may include a controller 920, a memory 930, and a communications unit 935. The memory 930 may be structured to include a database. The controller 920, the memory 930, and the communications unit 935 may be arranged to operate as a processing unit to control operation of the logging tool 200, 300, 400 and execute any methods disclosed herein. The processing unit may be configured to digitize detected photon count rates to generate digitized energy spectra having slope change, correlation coefficients, and/or amplitude over an energy range that is a result of the difference between a detected spectrum and a reference spectrum.

The communications unit 935 may include downhole communications for appropriately located sensors in a wellbore. Such downhole communications can include a telemetry system. The communications unit 935 may use combinations of wired communication technologies and wireless technologies at frequencies that do not interfere with on-going measurements.

The system 900 may also include a bus 937, where the bus 937 provides electrical conductivity among the components of the system 900. The bus 937 can include an address bus, a data bus, and a control bus, each independently configured or in an integrated format. The bus 937 may be realized using a number of different communication mediums that allows for the distribution of components of the system 900. The bus 937 may include a network. Use of the bus 937 may be regulated by the controller 920.

The system 900 may include display unit(s) 960 as a distributed component on the surface of a wellbore, which may be used with instructions stored in the memory 930 to implement a user interface to monitor the operation of the logging tool 200, 300, 400 or components distributed within the system 900. The user interface may be used to input parameter values for thresholds such that the system 900 can operate autonomously substantially without user intervention in a variety of applications. The user interface may also provide for manual override and change of control of the system 900 to a user. Such a user interface may be operated in conjunction with the communications unit 935 and the bus 937. Many examples may thus be realized. A few examples of such examples will now be described.

Example 1 is a method for material evaluation, comprising: detecting photons from gamma ray interactions with material in an annular region between a geological formation and a casing; generating an energy spectrum from the detected photons; and determining a difference between materials in the annular region based on a comparison of the energy spectrum with a reference spectrum.

In Example 2, the subject matter of Example 1 can further include transmitting high energy photons into the annular region.

In Example 3, the subject matter of Examples 1-2 can further include transmitting neutrons into the geological formation.

In Example 4, the subject matter of Examples 1-3 can further include wherein detecting the photons comprises detecting the photons on a gamma detector through a collimator.

In Example 5, the subject matter of Examples 1-4 can further include wherein determining the difference between materials comprises comparing the spectrum shapes for the energy spectrum and the reference spectrum.

In Example 6, the subject matter of Examples 1-5 can further include wherein determining the difference between materials comprises comparing slope change, correlation coefficients, and/or amplitude for each of the energy spectrum and the reference spectrum.

In Example 7, the subject matter of Examples 1-6 can further include determining a quality of cement in the annular region based on the comparison between the energy spectrum and the reference spectrum.

In Example 8, the subject matter of Examples 1-7 can further include digitizing detected count rates of the detected photons prior to generating the energy spectrum.

In Example 9, the subject matter of Examples 1-8 can further include substantially continuously detecting photons, generating the energy spectrum, and determining the difference between materials as a logging tool is moved through a cased wellbore.

Example 10 is a logging tool comprising: a gamma detector to detect photons resulting from photon interactions with material disposed in an annular region between a geological formation and a casing; and a controller coupled to the detector to generate energy spectra based on detected photon count rates and to compare the generated energy spectra to reference spectra to determine a difference in materials between a reference material and the material disposed in the annular region.

In Example 11, the subject matter of Example 10 can further include a radioactive source in the tool a predetermined distance from the detector, wherein the radioactive source is configured to generate a photon stream into the annular region.

In Example 12, the subject matter of Examples 10-11 can further include wherein the radioactive source is a chemical gamma source.

In Example 13, the subject matter of Examples 10-12 can further include a collimator coupled to the gamma detector.

In Example 14, the subject matter of Examples 10-13 can further include wherein the collimator is angled toward a radioactive source in the tool.

In Example 15, the subject matter of Examples 10-14 can further include wherein the collimator is angled towards the geological formation such that the gamma detector and collimator are configured to detect photons from the geological formation.

In Example 16, the subject matter of Examples 10-15 can further include a neutron source in the tool a predetermined distance from the detector, wherein the neutron source is configured to generate a neutron stream into the geological formation.

Example 17 is a system comprising: a downhole tool including a logging tool, the logging tool comprising: a gamma detector to detect photons resulting from photon interactions with material disposed in an annular region between a geological formation and a casing; and a controller coupled to the detector to generate digitized energy spectra based on detected photon count rates at different energy levels and to compare the generated energy spectra to reference spectra to evaluate the material in the annular region as compared to a reference material.

In Example 18, the subject matter of Example 17 can further include wherein the logging tool is disposed in a one of a wireline tool or a drill string tool.

In Example 19, the subject matter of Examples 17-18 can further include wherein the logging tool is passive tool having a collimator coupled to the gamma detector, wherein the collimator is angled towards the formation.

In Example 20, the subject matter of Examples 17-19 can further include where in the logging tool is an active tool having a radioactive source, the logging tool further comprising a second gamma detector wherein the gamma detector comprises a first collimator and the second gamma detector comprises a second collimator, the first collimator angled to receive scattered photons from the geological formation and the second collimator angled to receive scattered photons from the material.

Although specific examples have been illustrated and described herein, it will be appreciated by those of ordinary skill in the art that any arrangement that is calculated to achieve the same purpose may be substituted for the specific examples shown. Various examples use permutations and/or combinations of examples described herein. It is to be understood that the above description is intended to be illustrative, and not restrictive, and that the phraseology or terminology employed herein is for the purpose of description. Combinations of the above examples and other examples will be apparent to those of skill in the art upon studying the above description.

What is claimed is:

1. A method comprising:
    generating an energy spectrum from photons detected from gamma ray interactions with material in an annular region between a geological formation and a casing;
    comparing the energy spectrum with at least a first reference spectrum of a plurality of reference spectra based, at least in part, on at least one of slope change, correlation coefficients, and amplitude for spectrum shapes of the energy spectrum and the first reference spectrum, wherein each of the plurality of reference spectra corresponds to a known material; and
    based on the comparing, determining whether at least one of a void, gap, and fluid exists in cement in the annular region.

2. The method of claim 1, further comprising transmitting high energy photons into the annular region.

3. The method of claim 1, further comprising transmitting neutrons into the geological formation.

4. The method of claim 1, wherein the photons detected from gamma ray interactions comprise photons detected on a gamma detector through a collimator.

5. The method of claim 1, further comprising digitizing count rates of the photons detected from gamma ray interactions prior to generating the energy spectrum.

6. The method of claim 1, further comprising substantially continuously generating an energy spectrum from photons detected from gamma ray interactions and determining whether at least one of a void, gap, and fluid exists in cement as a logging tool is moved through a cased wellbore.

7. The method of claim 1, wherein the gamma ray interactions correspond to gamma rays emitted from a radioactive source in a logging tool.

8. The method of claim 1, wherein detecting the photons comprises detecting scattered photons from the material in the annular region.

9. The method of claim 1, wherein the known material comprises at least one of intact cement, cement with at least one of a void and gap, drilling fluid, and water.

10. A logging tool comprising:
    a gamma detector; and
    a controller coupled to the gamma detector programmed to,
    generate an energy spectrum based on photon count rates which are based, at least in part, on photon interactions detected by the gamma detector;
    compare the energy spectrum to reference spectra based, at least in part, on at least one of slope change, correlation coefficients, and amplitude for spectrum shapes of the energy spectrum and the reference spectra, wherein each of the reference spectra corresponds to a known material; and based on the comparison, determine whether at least one of a void, gap, and fluid exists in a material disposed in an annular region between a geological formation and a casing.

11. The logging tool of claim 10, further comprising a radioactive source in the logging tool a predetermined distance from the gamma detector, wherein the radioactive source generates a photon stream into the annular region.

12. The logging tool of claim 11, wherein the radioactive source is a chemical gamma source.

13. The logging tool of claim 10, further comprising a collimator coupled to the gamma detector.

14. The logging tool of claim 13, wherein the collimator is angled towards a radioactive source in the logging tool, and wherein the gamma detector and collimator detect scattered photons from the material disposed in the annular region.

15. The logging tool of claim 13, wherein the collimator is angled towards the geological formation, and wherein the gamma detector and collimator detect photons from the geological formation.

16. The logging tool of claim 10, further comprising a neutron source in the logging tool a predetermined distance from the gamma detector, wherein the neutron source generates a neutron stream into the geological formation.

17. A system comprising:
a logging tool comprising,
a gamma detector; and
a controller coupled to the gamma detector to,
generate an energy spectrum based on photon count rates which are based, at least in part, on photon interactions detected by the gamma detector;
compare the energy spectrum to at least a first reference spectrum of a plurality of reference spectra based, at least in part, on at least one of slope change, correlation coefficients, and amplitude for spectrum shapes of the energy spectrum and the first reference spectrum, wherein each of the plurality of reference spectra corresponds to a known material; and
based on the comparison, determine whether at least one of a void, gap and fluid exists in a material disposed in an annular region between a geological formation and a casing.

18. The system of claim 17, wherein the logging tool is a passive tool having a collimator coupled to the gamma detector, wherein the collimator is angled towards the geological formation.

19. The system of claim 17, wherein the logging tool is an active tool having a radioactive source, the logging tool further comprising a second gamma detector wherein the gamma detector comprises a first collimator and the second gamma detector comprises a second collimator, the first collimator angled to receive scattered photons from the geological formation and the second collimator angled to receive scattered photons from the material.

20. The system of claim 17, wherein the known material comprises at least one of intact cement, cement with at least one of a void and gap, drilling fluid, and water.

* * * * *